United States Patent
Pehrsson et al.

(10) Patent No.: US 6,314,183 B1
(45) Date of Patent: Nov. 6, 2001

(54) PORTABLE COMMUNICATION DEVICE WITH A MOVABLE ELEMENT AND A SENSOR FOR DETECTING THE POSITION THEREOF

(75) Inventors: Claes Göran Pehrsson; Mats Ove Larsson, both of Malmö(SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/246,444

(22) Filed: Feb. 8, 1999

(30) Foreign Application Priority Data

Feb. 9, 1998 (SE) .................................................. 9800355

(51) Int. Cl.[7] .................................................. H04M 1/00
(52) U.S. Cl. .................................................. 379/433.06
(58) Field of Search ................ 379/433; 248/309.1; D14/140; 335/2, 91; 70/278; 323/19

(56) References Cited

U.S. PATENT DOCUMENTS

| | | | |
|---|---|---|---|
| 4,161,685 | * 7/1979 | Jacob | 323/19 |
| 5,128,641 | * 7/1992 | Posey | 335/151 |
| 5,257,310 | 10/1993 | Takagi et al. | |
| 5,384,844 | 1/1995 | Rydbeck | |
| 5,673,314 | * 9/1997 | Olkoski et al. | 379/433 |
| 5,870,914 | * 2/1999 | Dawson | 70/278 |

FOREIGN PATENT DOCUMENTS

| | | |
|---|---|---|
| 0 120 418 | 10/1984 | (EP) . |
| 0 275 996 | 7/1988 | (EP) . |
| 06303296 | 10/1994 | (JP) . |
| 0865368 | 3/1999 | (JP) . |

* cited by examiner

*Primary Examiner*—Jack Chiang
*Assistant Examiner*—Nora J Putt
(74) *Attorney, Agent, or Firm*—Burns, Doane, Swecker & Mathis, L.L.P.

(57) ABSTRACT

A portable communication device has an apparatus housing with a movable element attached thereto and a sensor for detecting a position of the movable element in relation to the apparatus housing. The communication device also has an electrodynamic device having a magnet. The sensor is arranged to detect the magnetic field originating from the magnet in the electrodynamic device and to provide an output which is relative to the apparatus housing. A device is provided, in the movable element, for conducting the magnetic field from the electrodynamic device to the sensor.

33 Claims, 1 Drawing Sheet

PORTABLE COMMUNICATION DEVICE WITH A MOVABLE ELEMENT AND A SENSOR FOR DETECTING THE POSITION THEREOF

TECHNICAL FIELD

The present invention relates to a portable communication device, comprising an apparatus housing with a movable element attached thereto and a sensor for detecting a position of the movable element in relation to the apparatus housing, the communication device further being provided with electrodynamic means comprising a magnet, and the sensor being arranged to detect the magnetic field originating from the magnet in the electrodynamic means and to provide an output, which is related to the position of the movable element relative to the apparatus housing.

BACKGROUND

Portable communication devices comprising a movable element attached to an apparatus housing are known as such from e.g. EP-B-0 275 996, JP-A-08065368, JP-A-06303296, U.S. Pat. No. 5,384,844, U.S. Pat. No. 5,257,310 and EP-A-0 120 418. As seen in these prior art documents, portable communication devices as described above are available in many different kinds, such as mobile or cellular telephones, wireless telephone handsets, etc.

In the case of mobile telephones the movable element usually has the form of a flip, which is pivotally or slidably mounted, by means of for instance a hinge mechanism, to the main apparatus housing of the telephone. The flip is movable between two end positions. In the first position the flip is fully folded in or displaced in close proximity to a portion of the apparatus housing, normally the portion at which a key pad is located, the flip thereby protecting the key pad from accidental actuation. The second end position of the flip is a fully opened or extended position, wherein the entire front surface of the telephone is accessible to a user during e.g. ongoing calls. Furthermore, as is well known in the technical field, the mobile telephone comprises audio-generating means, such as a speaker with a voice coil and a magnet for exposing the voice coil to a magnetic field, and/or a buzzer (summer) for generating audio signals indicative of e.g. an incoming call. Additionally, the telephone may comprise an electrodynamic vibrator with a similar function.

It is often desired to detect the current position of the flip relative to the apparatus housing. For instance, the processor (CPU) of the mobile telephone may be arranged to control the enlightening of the display and the key pad, once the flip is moved from its closed position to its open or extended position. Additionally, when the flip is folded in from its open position, the processor may be arranged to control the termination of an ongoing call (i.e. to perform an on-hook operation). For the purpose of detecting the position of the flip and the reporting thereof to the processor, it is previously known to provide the mobile telephone with a magnetic sensor, such as a hall element or a reed switch, in the apparatus housing, while the flip is provided with a magnet. The location of the magnet in the flip relative to the hall element or reed switch in the apparatus housing is such that, when the flip is closed or folded in, the distance between the magnet and the magnetic sensor is short enough for the latter to detect the presence of the magnetic field generated by the former. On the other hand, when the flip is opened or folded out, the distance between the magnet and the magnetic sensor is considerably larger and particularly too large for the magnetic sensor to be able to detect the magnetic field from the magnet. Hence, in this way the mobile telephone is able to detect the position of the flip relative to the main apparatus housing.

The drawback of the prior art approach is that the need for a separate magnet in the flip implies a cost penalty as well as difficulties in mounting the magnet in a satisfactory way in the flip, since the magnet will have to be large enough for generating a sufficiently strong magnetic field.

U.S. Pat. No. 5,673,314 discloses a mobile telephone having a speaker with a magnet, both of which are located in the flip and are arranged to magnetically affect a switch located in the telephone housing. Hence, the magnetic field generated by the speaker magnet is used for detecting the position of the flip, wherein the need for a separate magnet is eliminated.

The drawback of the solution shown in U.S. Pat. No. 5,673,314 is that the location of the speaker in the flip requires electrical wiring between the telephone housing and the flip. Such electrical wiring is volnerable to e.g. dirt, moisture and mechanical damage.

SUMMARY

The object of the present invention is to eliminate the drawbacks of the portable communication devices of the prior art, as described above.

More specifically, the object of the present invention is to provide a portable communication device having an apparatus housing and a movable element (such as a flip), wherein the position of the movable element may be detected without any separate magnet and wherein electrical wiring between the apparatus housing and movable element is avoided.

The object is achieved for a portable communication device, such as a mobile telephone, comprising an apparatus housing with a movable element, such as a flip, attached thereto and a sensor for detecting a position of the movable element in relation to the apparatus housing, the communication device further being provided with electrodynamic means comprising a magnet, such as a speaker, a buzzer and/or a vibrator, and the sensor being arranged to detect the magnetic field from the magnet in the electrodynamic means so as to provide an output, which is related to the position of the movable element relative to the apparatus housing, by the provision of means in the movable element for conducting the magnetic field from the electrodynamic means to the sensor.

Other objects, advantages and features of the present invention appear from the following detailed description, from the drawings as well as from the appended patent claims.

BRIEF DESCRIPTION OF THE DRAWINGS

The invention will now be described in more detail in the following, reference being made to the accompanying drawings, in which.

DETAILED DESCRIPTION

Figure 1:
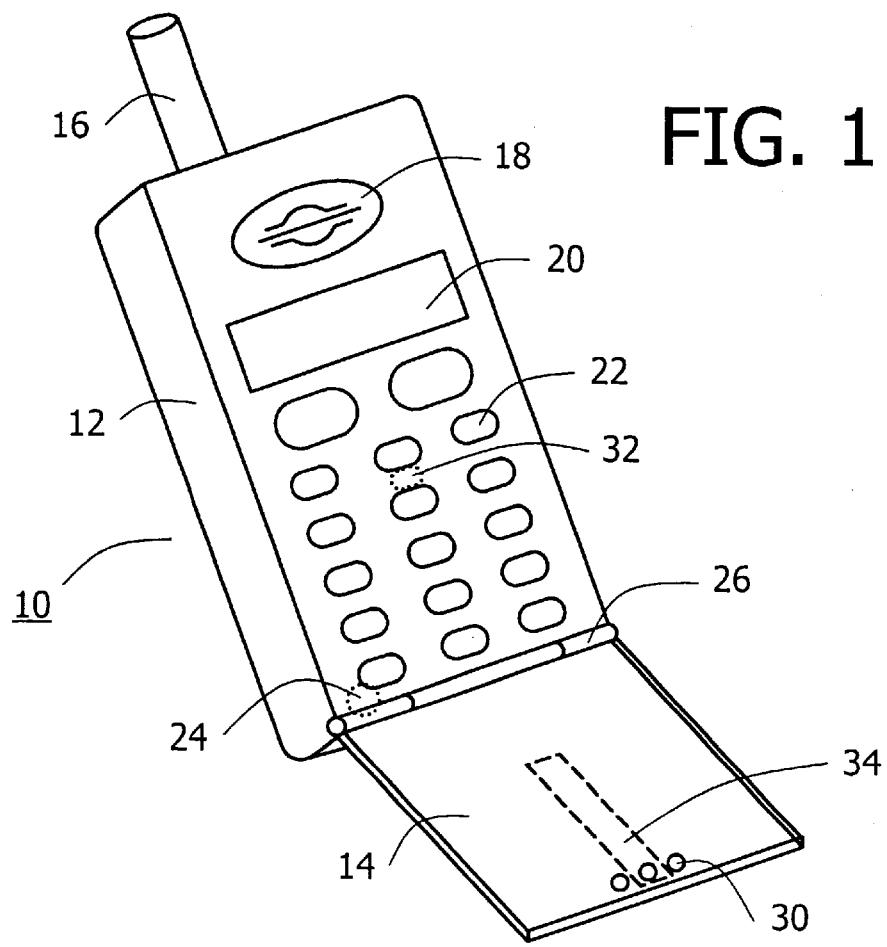
FIG. 1 is a schematic perspective view of a portable communication device in the form of a mobile telephone according to a preferred embodiment of the present invention.

FIG. 1 illustrates a portable communication device in the form of a mobile telephone 10 according to a preferred embodiment of the present invention. The mobile telephone 10 comprises an apparatus housing 12, to which a movable flip 14 is pivotally mounted by means of a hinge mechanism 26. The telephone 10 comprises various elements known per se, such as an antenna 16, a speaker 18, a display 20, a key pad 22 and a microphone 24. Furthermore, the flip 14 comprises an internal sound-guiding channel (not shown), which also is known from the prior art and which extends longitudinally from a first end of the flip opposite the hinged end 26 to a second end, at which the microphone 24 is embedded inside the apparatus housing 12. At the first end of the flip 14 a plurality of sound openings 30 are provided for the purpose of receiving spoken sound waves from the user, the sound waves then being guided through the internal part of the flip 14 and through the hinge mechanism 26 to the microphone 24.

Furthermore, the mobile telephone 10 is provided with a magnetic sensor 32, which is located inside the housing 12 beneath the keypad 22, as illustrated in FIG. 1 by way of a dashed rectangle. The magnetic sensor 32 is connected, through conventional electrical conductors not illustrated in the drawing, to the logic circuitry inside the apparatus housing 12. As will be apparent to a man skilled in the art the logic circuitry comprises e.g. a central processing unit (CPU), various memory circuits, controllers, etc.

The magnetic sensor 32 is of type, which is capable of detecting the presence of a magnetic field and converting this into an electric signal, which is provided as an output from the sensor 32 and which is related to the magnitude or field strength of the magnetic field. Hence, the magnetic sensor 32 will detect the presence of a magnetic field and convert the detected value into a corresponding electrical signal, which is supplied to the logic circuitry of the mobile telephone. The magnetic sensor 32 may be a hall element, a reed switch, a GMR sensor (i.e. a giant magnetoresistive sensor) or any other suitable element known from the field of magnetic detecting devices.

Figure 2:
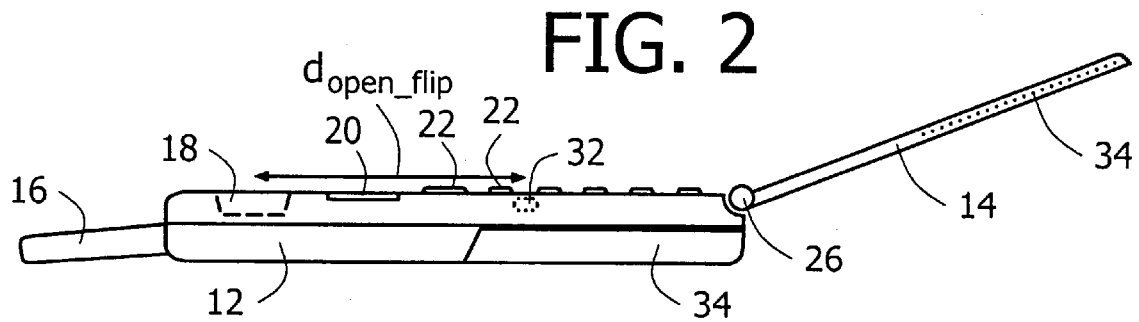
FIG. 2 is a schematic side view of the device of FIG. 1, wherein a movable element assumes an open position.
Figure 3:
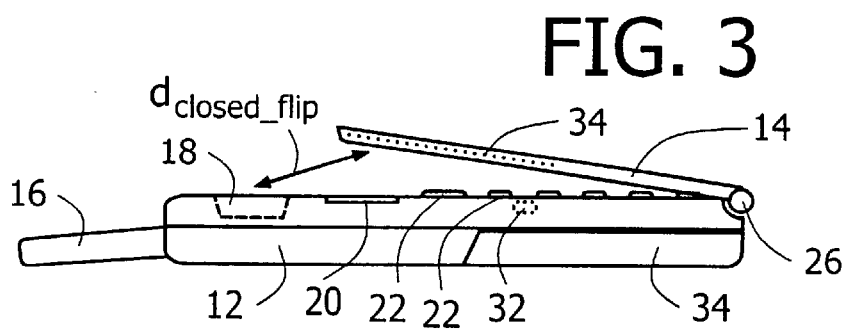
FIG. 3 is a schematic side view of the device of FIG. 1, wherein the movable element assumes an almost closed position.

Contrary to some of the prior art mobile telephones described in previous sections, the inventive mobile telephone has no separate magnetic element for affecting the magnetic sensor 32. Instead, the magnet already present in the speaker 18 is used as a source of magnetic field for the purpose of detecting the position of the flip 14 relative to the apparatus housing 12 by means of the magnetic sensor 32. The magnetic field, or part of it, is conducted from the speaker 18 to the sensor 32 by a means or element 34, which is located in the flip 14, as shown in FIGS. 1–3. The means 34 is preferably a piece of metal plate attached to or embedded in the flip 14, the metal plate hence being located in or in parallel to the plane of the flip 14. When the flip 14 assumes an open position (cf. FIG. 2), the metal plate will have no influence on the magnetic sensor 32. When, on the other hand, the flip 14 is closed as in FIG. 3, the metal plate will conduct a portion of the magnetic field from the speaker or buzzer 18 to the magnetic sensor 32, the latter thereby being able to detect the magnetic field. Such an arrangement may also assist in-keeping the flip tight to the telephone by way of magnetic force.

The inventive principle is best shown is FIGS. 2 and 3, in which the mobile telephone 10 is illustrated in side views. In FIG. 2 the flip 14 assumes an open or folded out position, i.e. a position in which the mobile telephone 10 may be used for telephone conversation, while in FIG. 3 the flip 14 assumes an almost (for illustrating purposes) closed position, essentially corresponding to the position, to which the flip 14 is moved by a user after termination of the call. The apparatus housing 12, the flip 14, the antenna 16, the speaker 18, the display 20, the key pad 22, the hinge mechanism 26 and the magnetic sensor 32 are all identical in FIGS. 1–3, while a battery 34 is illustrated in FIGS. 2 and 3 but not in FIG. 1.

When the flip 14 is in its open position according to FIG. 2, the magnetic distance $d_{open\_flip}$ between the magnetic sensor 32 and the speaker 18 is quite large, and since the strength of the magnetic field generated around the speaker 18 by the magnet thereof will decrease as a function of distance, the magnetic sensor 32 will only detect a magnetic field with a very weak field strength or even a zero field strength. As a consequence, the output signal provided by the magnetic sensor 32 to the logic circuitry of the mobile telephone will have a very low or even zero value. As seen in FIG. 3, on the other hand, when the flip 14 is in a closed or nearly closed position, the magnetic distance $d_{closed\_flip}$ will be considerably shorter than the distance $d_{open\_flip}$ in FIG. 2, since the metal plate 34 will conduct the magnetic field from the speaker 18 to the sensor 32. Consequently, the field strength of the magnetic field generated by the magnet of the speaker 18 and detected by the magnetic sensor 32 will be much larger than the one of FIG. 2. Accordingly, the output signal value supplied by the magnetic sensor 32 will exhibit a much larger value.

In this way the logic circuitry of the mobile telephone 10 is informed, by means of the magnetic sensor 32 and the metal plate 34, of the position of the flip 14 relative to the apparatus housing 12. This information may be used for e.g. enlightening the display 20 and/or the key pad 22, when the user moves the flip 14 from its closed position according to FIG. 3 to its open or folded out position according to FIG. 2. Furthermore, the logic circuitry may interpret the information of the flip 14 being closed or folded in by the user as an indication that an on-going call is to be terminated (i.e. an on-hook operation is to be performed). Furthermore, the logic circuitry may put itself in an idle or stand-by mode for conserving power.

As an alternative to the embodiment described above with reference to FIGS. 1–3, any electrodynamic means already present in the mobile telephone, such as a buzzer or a vibrator, may be used as a source of magnetic field, instead of the speaker magnet 18.

The present invention has been described above with respect to preferred and alternative embodiments. However, embodiments other than the ones disclosed and described above are possible within the scope of the invention,

What is claimed is:

1. A portable communication device, comprising an apparatus housing with a movable element attached thereto, a sensor for detecting a position of the movable element in relation to the apparatus housing, and electrodynamic means comprising a magnet, the sensor being arranged to detect the magnetic field originating from the magnet in the electrodynamic means and to provide an output, which is related to the position of the movable element relative to the apparatus housing, the movable element comprising means for conducting the magnetic field from the electrodynamic means to the sensor, wherein said means for conducting the magnetic field is a metal plate arranged in or in parallel with a plane in which the movable element is oriented.

2. A portable communication device, comprising an apparatus housing with a movable element attached thereto, a sensor for detecting a position of the movable element in relation to the apparatus housing, and electrodynamic means comprising a magnet, the sensor being arranged to detect the magnetic field originating from the magnet in the electrodynamic means and to provide an output, which is related to the position of the movable element relative to the apparatus housing, the movable element comprising means for conducting the magnetic field from the electrodynamic means to the sensor, wherein the electrodynamic means and the sensor are located in or on the apparatus housing.

3. A device according to claim 1, wherein the sensor is a hall element.

4. A device according to claim 1, wherein the sensor is a reed switch.

5. A device according to claim 1, wherein the sensor is a giant magnetoresistive (GMR) sensor.

6. A device according to claim 1, wherein the electrodynamic means comprises a speaker.

7. A device according to claim 1, wherein the electrodynamic means comprises a buzzer.

8. A device according to claim 1, wherein the electrodynamic means comprises a vibrator.

9. A device according to claim 1, wherein the device is a mobile telephone.

10. A device according to claim 9, wherein the movable element is a flip mounted to the apparatus housing by a hinge mechanism.

11. A portable communication device, comprising:

an apparatus housing;

a movable element attached to the housing;

electrodynamic means positioned in the apparatus housing and comprising a magnet;

a sensor positioned in the apparatus housing; and means, positioned in the movable element, for conducting a magnetic field from the magnet of the electrodynamic means to the sensor, wherein the sensor is arranged to detect said magnetic field and provide an output which is related to the position of the movable element relative to the apparatus housing.

12. A device according to claim 11, wherein said means for conducting the magnetic field is a metal plate arranged in or in parallel with a plane in which the movable element is oriented.

13. A device according to claim 11, wherein the sensor includes a hall element.

14. A device according to claim 11, wherein the sensor includes a reed switch.

15. A device according to claim 11, wherein the sensor includes a giant magnetoresistive (GMR) sensor.

16. A device according to claim 11, wherein the electrodynamic means comprises a speaker.

17. A device according to claim 11, wherein the electrodynamic means comprises a buzzer.

18. A device according to claim 11, wherein the electrodynamic means comprises a vibrator.

19. A device according to claim 11, wherein the device includes a mobile telephone.

20. A device according to claim 11, wherein the movable element includes a flip mounted to the apparatus housing by a hinge mechanism.

21. A portable communication device, comprising:

housing;

an electrodynamic means disposed within the housing and including a magnet that generates a magnetic field;

a magnetic sensor disposed within the housing and physically displaced from the magnet, so that the magnetic sensor generates a first output signal in response to the magnetic field generated by the magnet;

a flip cover including an element for conducting a magnetic field from the magnet to the sensor and moveable between a first position in which the magnetic sensor generates the first output signal, and a second position in which the element conducts a portion of the magnetic field to the sensor so that the sensor generates a second output signal, different than the first output signal.

22. A portable communication device according to claim 21, wherein:

the magnetic sensor is displaced from the speaker by a distance sufficient to cause the first output to be a low signal.

23. A portable communication device according to claim 21, wherein:

the second signal is greater than the first signal.

24. A portable communication device according to claim 21, wherein:

the flip cover is pivotally connected to the housing of the portable communication device by a hinge.

25. A portable communication device according to claim 24, wherein:

the first position corresponds to the flip cover being open, and the second position corresponds to the flip cover being closed.

26. A device according to claim 2, wherein the sensor is a hall element.

27. A device according to claim 2, wherein the sensor is a reed switch.

28. A device according to claim 2, wherein the sensor is a giant magnetoresistive (GMR) sensor.

29. A device according to claim 2, wherein the electrodynamic means comprises a speaker.

30. A device according to claim 2, wherein the electrodynamic means comprises a buzzer.

31. A device according to claim 2, wherein the electrodynamic means comprises a vibrator.

32. A device according to claim 2, wherein the device is a mobile telephone.

33. A device according to claim 32, wherein the movable element is a flip mounted to the apparatus housing by a hinge mechanism.

* * * * *